J. D. FAHNESTOCK & L. A. POWELL.
Dental Plate.
No. 200,445.                Patented Feb. 19, 1878.
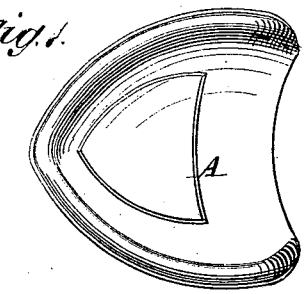
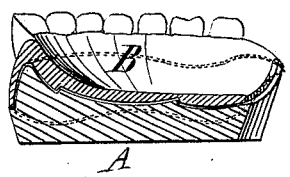
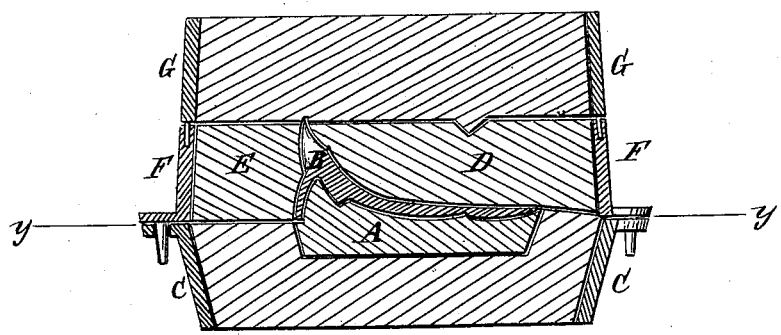
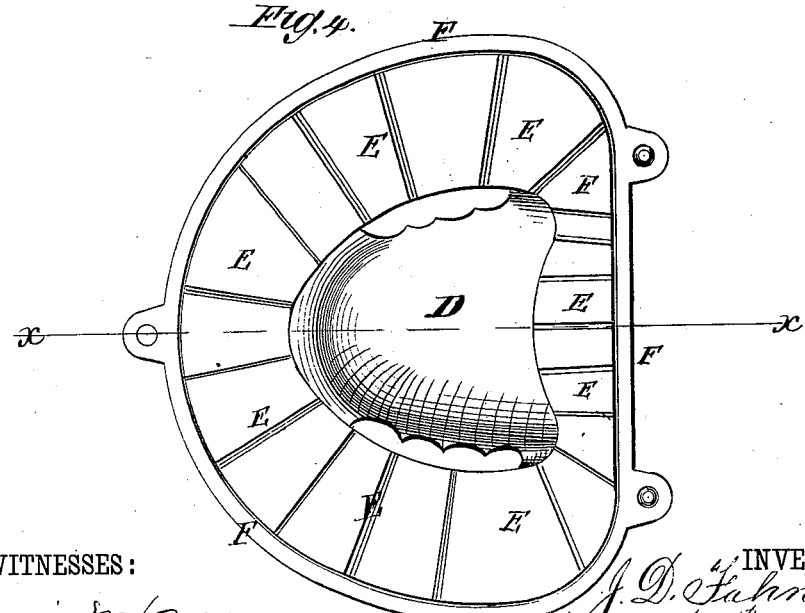
WITNESSES:
Francis McArdle
J. H. Scarborough
INVENTORS
J. D. Fahnestock
L. A. Powell
BY Munn & Co
ATTORNEYS.

UNITED STATES PATENT OFFICE.

JAMES D. FAHNESTOCK AND LLEWELLYN A. POWELL, OF AURORA, ILL.; SAID POWELL ASSIGNOR TO OSBORN WILLSON, OF SAME PLACE.

IMPROVEMENT IN DENTAL PLATES.

Specification forming part of Letters Patent No. 200,445, dated February 19, 1878; application filed November 19, 1877.

*To all whom it may concern:*

Be it known that we, JAMES D. FAHNESTOCK and LLEWELLYN A. POWELL, of Aurora, in the county of Kane and State of Illinois, have invented a new and Improved Dental Plate, of which the following is a specification:

Our invention has for its object to furnish, and consists in, a mineral dental plate in which the teeth and plate are molded in one piece, as will be hereinafter described.

In the accompanying drawings, Figure 1 is a plan view of the base-plate for the dental pattern. Fig. 2 is a cross-section of the same and the dental pattern together. Fig. 3 is a cross-section, on the line $x\ x$ of Fig. 4, of the dental mold complete. Fig. 4 is a plan view of the upper flask of the mold, separated along the line $y\ y$ of Fig. 3, and inverted.

Similar letters of reference indicate corresponding parts.

A is the model, made of plaster-of-paris, and taken from an impression of either jaw. On this model A we form a wax plate of the desired thickness for plate on the palatine surface, and arrange on the said wax plate the teeth, (natural or artificial,) the plate and teeth together constituting the dental pattern B.

The model A being embedded in plaster in the lower flask C, as seen in Fig. 3, and the pattern B placed in position thereon, the central section D and the surrounding sections E are molded on and around it in the flask F, after which the top flask G is put in place on the flask F, and filled with plaster, to make a tight joint and keep the sections D E in position. The mold, being thus completed, is then taken apart, and the dental pattern B removed and laid aside.

It is evident that by putting the mold together again a cavity is left therein of the exact size and shape of the whole dental pattern, teeth, and plate together. The mineral or porcelain material, made into a pulpy mass by the addition of water, is packed into the cavity thus formed, and, when hardened sufficiently, is taken out, (after carefully removing the mold, section after section,) and then heated in a furnace until it has attained the requisite hardness for being handled for enameling. It is then allowed to cool, whereupon the enamel or gum color is applied, and it is submitted to an intense heat, which completes the process. The article thus produced is a complete dental plate, teeth and palate plate, formed of one mass, in one piece, and of the exact shape and size of the dental pattern B. A dental plate with only one or a few teeth is molded in the same manner.

In the Loomis process the center piece is plastic porcelain, and the teeth carved with a sharp tool, afterward partially baked, and then set into the mass of porcelain, the union of plate and teeth being secured by intense heat. With a view to overcome the objections to this process, (under which we have worked for years,) we made experiments which resulted in the present invention.

To carve the teeth properly requires a very high degree of skill, while the subsequent setting of them is uncertain and often very imperfect. It will be observed that in our process we have the shape of our teeth in our sectional molds, as well as that of the plate, and that in this mold we pack the plastic porcelain.

As soon as the mold is full the representation of the jaw is forced into this mass of porcelain by pressure until the plate and teeth are densified and rendered very strong. The pattern-teeth, being mounted in the mouth of patient, are accurate before the sectional molds are taken from pattern in which is formed the final porcelain plate.

We are aware that it is not new to mount porcelain teeth on a porcelain plate, the two made separately, and the porcelain modeled over the cast and around porcelain teeth; but

What we claim is—

A process of forming a dental plate and teeth in one homogeneous piece of porcelain, by first taking a pattern of plate and teeth directly from the mouth of patient, and from this forming a sectional mold, then packing this mold with a mass of plastic porcelain and subjecting it to pressure, the product being finished in the usual manner, as described.

JAMES D. FAHNESTOCK.
LLEWELLYN A. POWELL.

Witnesses:
GEO. F. SCHOEBERLEIN,
J. P. LENTZ.